(12) United States Patent
Uehara et al.

(10) Patent No.: US 8,049,424 B2
(45) Date of Patent: Nov. 1, 2011

(54) LIGHT SOURCE INCORPORATING A PROXIMITY GUIDE PORTION ON AN EXTERNAL SURFACE OF A SEALING PORTION FOR SECURING A TRIGGER WIRE

(75) Inventors: Sumio Uehara, Gyoda (JP); Tooru Nagase, Gyoda (JP); Kyouichi Maseki, Gyoda (JP); Kouichi Nakajima, Gyoda (JP); Makoto Ookahara, Gyoda (JP); Yoshiaki Komatsu, Gyoda (JP); Masaki Hirota, Minamiuonuma (JP); Masaki Kamimura, Minamiuonuma (JP)

(73) Assignee: Iwasaki Electric Co., Ltd., Tokyo (JP)

( * ) Notice: Subject to any disclaimer, the term of this patent is extended or adjusted under 35 U.S.C. 154(b) by 342 days.

(21) Appl. No.: 12/302,303

(22) PCT Filed: May 23, 2007

(86) PCT No.: PCT/JP2007/060522
§ 371 (c)(1), (2), (4) Date: Feb. 20, 2009

(87) PCT Pub. No.: WO2007/138955
PCT Pub. Date: Dec. 6, 2007

(65) Prior Publication Data
US 2011/0084587 A1 Apr. 14, 2011

(30) Foreign Application Priority Data
May 26, 2006 (JP) .................... 2006-147301

(51) Int. Cl.
*H01J 61/54* (2006.01)
*H01J 61/56* (2006.01)
(52) U.S. Cl. ................... 313/594; 313/607; 313/234
(58) Field of Classification Search .......... 313/601–604, 313/607, 234, 594
See application file for complete search history.

(56) References Cited

U.S. PATENT DOCUMENTS
6,563,267 B1    5/2003   Van Den Nieuwenhuizen et al.
(Continued)

FOREIGN PATENT DOCUMENTS
JP          8-87984         4/1996
(Continued)

OTHER PUBLICATIONS
English language Abstract of JP 8-87984, Apr. 2, 1996.
(Continued)

*Primary Examiner* — Mariceli Santiago
(74) *Attorney, Agent, or Firm* — Greenblum & Bernstein, P.L.C.

(57) ABSTRACT

The invention relates to a light source device having a high-voltage discharge lamp (1) on which a trigger line (10) for triggering the lamp is attached. The high-voltage discharge lamp (1) is formed such that an arc tube (7) having a pair of substantially cylindrical sealing portions (9R, 9L) formed on both sides in the longitudinal direction with a light emitting portion (8) in between is sealed with electrode assemblies (3R, 3L). The trigger line (10) is formed such that its one end (10*a*) is connected to a power supply lead (6), which is of the electrode assembly (3L) and protruded from the one sealing portion (9L), and its other end (10*c*) is wound around the outer circumference of the other sealing portion (9R). In the light source device, in order to drastically improve the performance for triggering and retriggering the lamp (1), a vicinity guide portion (C) including a hollow groove (11) and an insert opening (17) is formed on a cylindrical portion of the other sealing portion (9R) at a position away from the light emitting portion (8). The vicinity guide portion (C) allows the trigger line (10) to be disposed at a distance shorter than the distance from the electrode assembly to the outer circumference surface of the cylindrical portion.

10 Claims, 9 Drawing Sheets

U.S. PATENT DOCUMENTS

2004/0207327 A1    10/2004    Takahashi et al.
2005/0213327 A1    9/2005    Kobayashi et al.

FOREIGN PATENT DOCUMENTS

| | | |
|---|---|---|
| JP | 9-265947 | 10/1997 |
| JP | 2003-526182 | 9/2003 |
| JP | 2004-335457 | 11/2004 |
| JP | 2005-283706 | 10/2005 |
| WO | 00/77826 | 12/2000 |

OTHER PUBLICATIONS

English language Abstract of JP 2005-283706, Oct. 13, 2005.
English language Abstract of JP 9-265947, Oct. 7, 1997.
English language Abstract of JP 2004-335457, Nov. 25, 2004.
English language Abstract of JP 2003-526182, Sep. 2, 2003.

*Fig. 6*
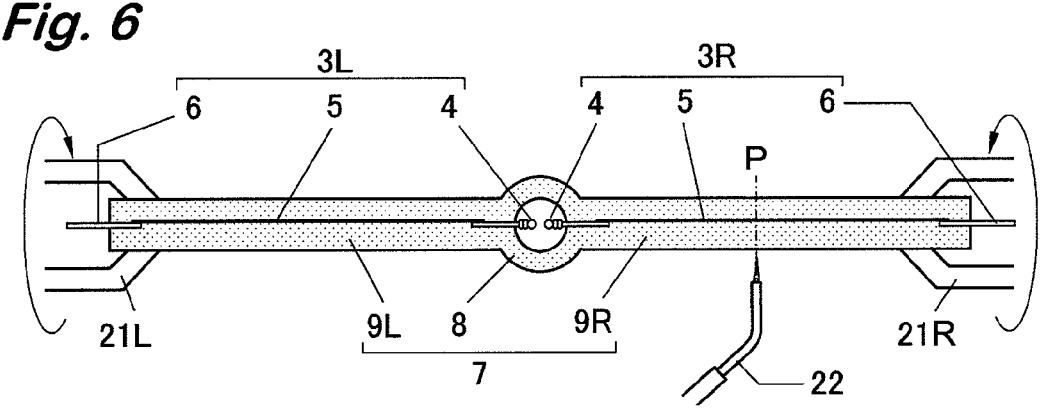
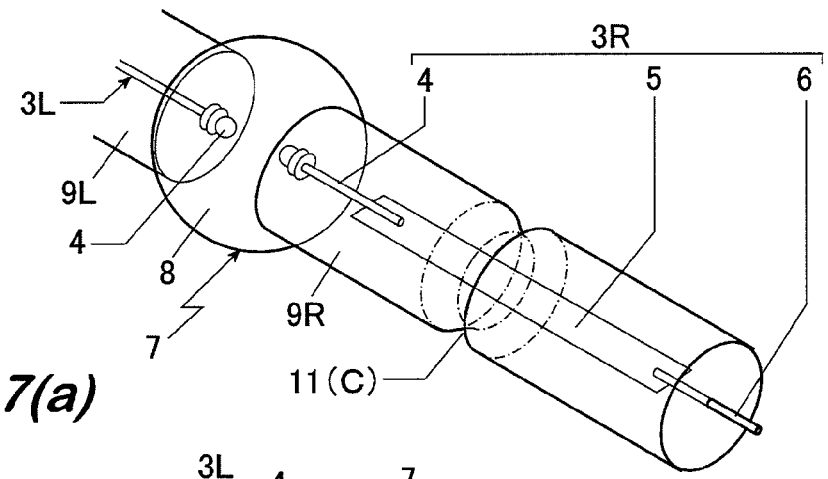
*Fig. 7(a)*
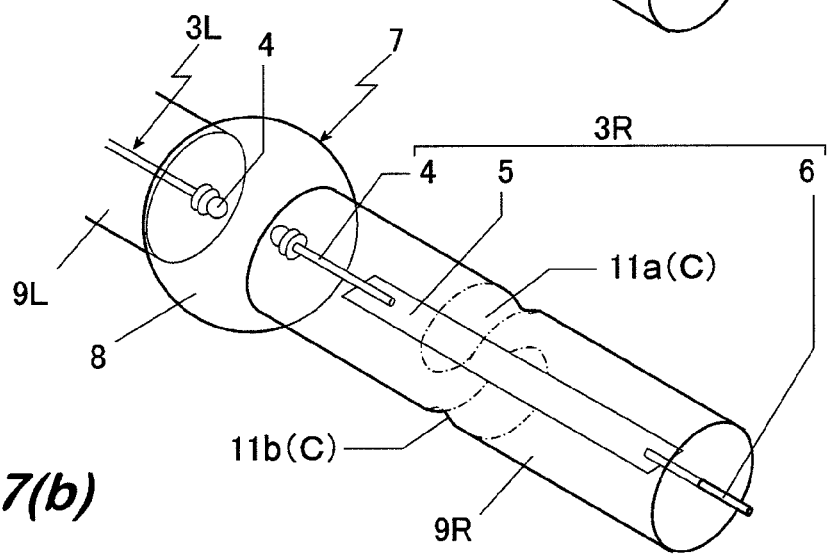
*Fig. 7(b)*

Pulse Voltage(kV)
applied to a starting voltage of 280V.

PRIOR ART

LIGHT SOURCE INCORPORATING A PROXIMITY GUIDE PORTION ON AN EXTERNAL SURFACE OF A SEALING PORTION FOR SECURING A TRIGGER WIRE

TECHNICAL FIELD

The present invention concerns a light source device used as a backlight for liquid crystal projectors or projection televisions and it particularly relates to a light source device provided with a trigger wire to a high pressure discharge lamp as a light source for enhancing the starting performance thereof.

BACKGROUND

Along with decrease in the size and the thickness of liquid crystal projectors and projection televisions, decrease in the size is also intended for the light source device assembled in such equipments, for example, by using a short arc type high pressure mercury vapor discharge lamp capable of obtaining a high luminance emission in a small size. However, since the high pressure discharge lamp of this type has no good starting performance in a cold state or re-starting performance in a hot state, it involved a problem that the rising time of the liquid crystal projector or the projection television was retarded.

Accordingly, while it is required to adopt means for enhancing the starting or re-starting performance of the lamp, since there is no extra space capable of affording an auxiliary starting electrode or the like in the emitting portion of a light emitting tube decreased in the size, starting of the lamp has been promoted by the means of increasing the starting voltage of the lamp and applying a high voltage pulse.

However, when the starting voltage of the high pressure discharge lamp is increased, since a sufficient insulation distance has to be ensured between wirings constituting a lighting circuit, this involves a problem of increasing the size of the lighting circuit to enlarge the installation space for the light source device, and the size of the liquid crystal projector, etc., can not be decreased.

Further, in a case where the pulse voltage of the high voltage pulse applied to the starting voltage is high, noises that cause erroneous operation to the electric circuits such as in a liquid crystal projector may possibly be generated.

In view of the above, for preventing the generation of noises and avoiding increase in the size of the lighting circuit, means for mounting a lamp starting trigger wire 41 capable of starting the lamp at a relatively low voltage to a high pressure discharge lamp 40 has been proposed (refer to patent documents 1, 2, and 3) as shown in FIG. 15.

The high pressure discharge lamp 40 has a constitution in which a pair of electrode assemblies 42R, 42L each having electrode 43 connected with a power supply lead 45 by way of a metal foil 44 comprising a molybdenum foil are inserted to both ends of a light emitting tube 46 comprising a quartz glass tube so as to oppose the electrodes 43 to each other in a light emitting portion 47 formed in the central portion of the light emitting tube 46 and fixed to a pair of sealing portions 48R, 48L for air tightly sealing the both ends thereof.

Generally, the trigger wire 41 mounted to the high pressure discharge lamp 40 by winding and securing at one end 41a directly to the outer periphery of the power supply lead 45 of the electrode assembly 42R protruded from the sealing portion 48R on one side and wound at the other end 41c in a looped shape around the outer periphery of the sealing portion 48L on the other side. Although not illustrated, it also includes a constitution in which a portion of the trigger wire 41 wired to the sealing portion 48L is spirally wound around lengthily along the outer periphery of the sealing portion 48L or in which two front and back loop portions are formed on the side of the other end 41c of the trigger wire 41 and both of the loop portions are wound separately on the side of the light emitting portion 47 and on the side of the metal foil 44 of the sealing portion 48L respectively (refer to patent document 4).

Further, for preventing that quartz as the material for the light emitting tube 46 is damaged by positive ions drawn to the trigger wire 41, thereby lowering the mechanical strength, it has been considered that the intermediate portion 41b of the trigger wire 41 is preferably not in contact with the surface of the light emitting tube 46 but mounted in a state spaced apart at least by several mm from the surface thereof (refer to patent documents 1 and 2).

[Patent document 1]
    Publication of JP-A No. 2004-335457
[Patent document 2]
    Publication of JP-A No. Hei 9-265947
[Patent document 3]
    Publication of JP-A No. Hei 8-87984
[Patent document 4]
    Publication of JP-A No. 2003-526182

However, according to the knowledge of the present inventors, it is confirmed that when the trigger wire 41 in the state as illustrated by a solid line being spaced apart from the surface of the light emitting tube 46 is brought closer to the surface of the light emitting tube 46 as illustrated by a broken line FIG. 15, the starting or re-starting performance can be improved. Further, in the liquid crystal projector and the projection television, since the length of the rising time dominates the value of commercial products, the high pressure discharge lamp used as the light source for them is particularly required to have good stating or re-starting performance and when the importance is attached most to the starting or re-starting performance thereof, the trigger wire 41 is preferably brought closer to the surface of the light emitting tube 46 to mount the intermediate portion 41b in a state in contact with the surface of the light emitting portion 47 of the light emitting tube 46 as illustrated by a broken line FIG. 15.

Then, when the present inventors have conducted a test for practical use on the high pressure discharge lamp 40 in which the intermediate portion 41b of the trigger wire 41 is in contact with the surface of the light emitting portion 47 of the light emitting tube 46 as illustrated by the broken line in FIG. 15, since the intermediate portion 41b of the trigger wire 41 is heated to a high temperature of about 900° C. upon lighting up of the lamp, to cause elongation due to thermal expansion and spaced apart from the surface of the light emitting portion 47 having a smaller heat expansion coefficient than that of the trigger wire 41, this leads to the result that the re-starting performance in the hot state is not preferred.

Particularly, when the trigger wire 41 is in a state in contact with the surface of the light emitting portion 47 not only at the intermediate portion 41b but also at the other end 41c that is wound around the outer periphery of the sealing portion 48L, elongation by thermal expansion of the other end portion 41C is also added to increase the extent that the intermediate portion 41b is spaced apart from the surface of the light emitting portion 47. In addition, although the trigger wire 41 mounted to the high pressure discharge lamp 40 is fixed by being wound and secured at one end 41a to the lead 45, since the other end 41c is not fixed but being merely wound around the outer periphery of the sealing portion 48L, it entirely causes slack or distort tending to be spaced apart from the surface of the light emitting tube 46. In addition, if slacking or distortion should occur, since the intermediate portion 41b does not return to the state in contact with the surface of the emitting portion 47 even when the trigger wire 41 is cooled and shrunk after putting off the lamp, the starting performance in the cold state is also lowered.

Further, as a light source device for a liquid crystal projector or a projection television, while a lamp having a reflection mirror in which a high pressure discharge lamp 40 is provided integrally with a concave reflection mirror 49 by fixing a sealing portion 48L on one side to the bottom portion 50 of the reflection mirror 49 is general, there is also such a constitution that an auxiliary-reflection mirror 52 is mounted to the sealing portion 48R for reflecting the light emitted from the light emitting portion 47 of the light emitting tube 46 toward the opening 51 of the concave reflection mirror 49 to the side of the light emitting portion 47 for improving the efficiency of utilizing the light of the high pressure discharge lamp 40, as shown in FIG. 16.

However, since the trigger wire 41 mounted to the high pressure discharge lamp 40 having the auxiliary-reflection mirror 52 mounted thereto cannot but be wired so as to pass the outside of the auxiliary-reflection mirror 52 as an obstacle while avoiding the same (refer to patent document 5), it is impossible to improve the starting or re-staring performance by approaching the trigger wire 41 to the surface of the light emitting tube 46.

[Patent document 5]
Publication of JP-A No. 2005-283706

DISCLOSURE OF THE INVENTION

Subject to be Solved by the Invention

The present invention has a technical subject of drastically improving the starting or re-starting performance of the high pressure discharge lamp by skillfully devising the mounting means for the trigger wire.

Means for Solving the Subject

For solving the subject described above, the present invention provides a light source device including a high pressure discharge lamp and a trigger wire for starting the lamp, in which the high pressure discharge lamp has a light emitting tube in which a pair of substantially cylindrical sealing portions are foamed on both longitudinal sides of a light emitting portion and a pair of electrode assemblies each having an electrode connected by way of a metal foil with a power supply lead, the electrode assemblies are inserted on both ends of the light emitting tube and sealed in the pair of sealing portions such that respective electrodes are opposed to each other in the light emitting portion, the trigger wire is connected at one end to the power supply lead of the electrode assembly protruded from one sealing portion and wound at the other end around the outer periphery of the other sealing portion, wherein a proximity guide portion is disposed to the cylindrical portion as the other sealing portion for disposing the trigger wire at a distance shorter than that from the electrode assembly to the outer peripheral surface of the cylindrical portion at a position away from the light emitting portion.

Effect of Invention

According to the invention, since the other end of the trigger wire wound around the outer periphery of the sealing portion is disposed to the proximity guide portion formed at a position away from the light emitting portion of the light emitting tube and is not in contact with the light emitting portion, the rate of elongation at the other end by thermal expansion is small.

Further, by bringing the trigger wire at the intermediated portion in a stretched state into contact with the surface of the light emitting portion of the light emitting tube and fixing the other end of the trigger wire in this state by winding around and securing to the proximity guide portion such as a concave groove or an insertion hole formed to the outer peripheral surface of the sealing portion, the extent that the trigger wire is spaced apart from the surface of the light emitting tube by thermal expansion is suppressed to the minimum.

Further, since the end of the trigger wire connected to one electrode assembly is wound around and secured to the proximity guide portion such as the concave groove or the insertion hole formed to the outer periphery of the sealing portion for securing the other electrode assembly, the distance between the trigger wire and the other electrode assembly is shortened by so much as a length corresponding to the depth of the proximity guide portion to increase the electric field intensity between both of them.

In this case, as the area for the trigger wire is narrower compared with the area for the electrode assembly, the trigger wire acts like a needle electrode and can concentrate the electric fields. Accordingly, when the trigger wire is wound around the concave groove, it is preferably wound by one turn.

With the function as described above, an excellent effect of remarkably improving the starting or re-starting performance of the high pressure discharge lamp can be obtained when compared with the existent case.

BEST MODE FOR PRACTICE CARRYING OUT THE INVENTION

The best mode for carrying out the light source device according to the invention includes a short arc type high pressure mercury vapor discharge lamp in which a pair of electrode assemblies each having a tungsten electrode connected by way of a metal foil comprising a molybdenum foil to a power supply lead are inserted in both ends of a light emitting tube comprising a quartz glass tube such that the respective electrodes are opposed to each other in a light emitting portion formed in the central portion of the light emitting tube and secured in a pair of sealing portions for air tightly sealing both ends thereof, wherein a trigger wire made of a highly heat resistant alloy wire is mounted with one end being connected by directly winding and securing to the power supply lead of the electrode assembly protruded from one sealing portion and with the other end being wound and secured in the inside of the proximity guide portion of the concave groove formed to the outer peripheral portion of the other sealing portion.

The concave groove is formed at a position where the other end of the trigger wire wound and secured to the concave groove is not in contact with the light emitting portion of the light emitting tube and, more preferably, formed at a position opposing to the metal foil of the electrode assembly fixed to the sealing portion, and is formed with a metal film to the inner surface thereof. Further, the high pressure discharge lamp is mounted integrally with a concave reflection mirror with the sealing portion on one side not formed with the concave groove being fixed to the bottom portion of the concave reflection mirror.

FIG. 1 is an entire view showing an example of a light source device according to the present invention.

FIG. 2 is an enlarged fragmentary perspective view showing a constitutional example of a concave groove as a proximity guide portion.

FIG. 3 is a graph showing the result of a re-starting experiment for a high pressure discharge lamp.

FIG. 4 is an explanatory view showing a method of forming the concave groove.

FIG. 5 is an explanatory view showing another method of forming the concave groove.

FIG. 6 is an explanatory view showing a further method of forming the concave groove.

FIG. 7 is a perspective view showing a high pressure discharge lamp formed with the concave groove by the method of FIG. 6.

FIG. 8 is a view showing another example of the light source device according to the present invention.

FIG. 9 is a graph showing a relation between a cold starting ratio and a pulse voltage applied upon starting.

FIG. 10 is a graph showing a relation between the hot re-starting ratio and a pulse voltage applied upon starting.

FIG. 11 is a perspective view showing a main portion of a further light source device according to the present invention.

FIG. 12 is an explanatory view showing a method of forming a trigger wire insertion hole.

FIG. 13 is an explanatory view showing the winding state of the trigger wire to the trigger wire insertion hole.

FIG. 14 is an entire view showing other example of the light source device according to the present invention, FIG. 15 and FIG. 16 are explanatory views showing existent light source devices.

Example 1

A light source device in FIG. 1 is a lamp having a reflection mirror for a liquid crystal projector in which a high pressure discharge lamp 1 comprising a short arc type high pressure mercury vapor discharge lamp having a rated lamp power of 150 W and a concave surface reflection mirror 2 with a reflection surface forming a parabolic surface are integrated. In the high pressure discharge lamp 1, a pair of electrode assemblies 3R,3L each having a tungsten electrode 4 connected by way of a metal foil 5 to a power supply lead 6 are inserted on both ends of a light emitting tube 7 comprising a quartz glass tube such that the electrodes 4, 4 are opposed to each other being kept at an inter-electrode distance of about 1.1 mm in a light emitting portion 8 formed in the central portion of the light emitting tube 7 and sealed at both ends in a pair of sealing portions 9R, 9L for air tightly sealing the both ends thereof.

In the light emitting tube 7 of the high pressure discharge lamp 1, the light emitting portion 8 is formed into an ellipsoid body having a maximum outer diameter of about 10 mm, an average thickness of 2.3 mm, and an inner volume of about 85 mm$^3$, in which mercury at about 0.24 mg/mm$^3$, bromine at about $1.9 \times 10^{-4}$ mol/mm$^3$, and an argon gas at about $2 \times 10^4$ Pa are sealed in the inside thereof.

Further, the sealing portions 9R, 9L of the light emitting tube 7 are formed each into a substantially cylindrical shape having an outer diameter of about 5.7 mm.

In the electrode assemblies 3R,3L secured to the respective sealing portions 9R, 9L, a tungsten electrode 4, a metal foil 5 comprising a molybdenum foil of about 1.5 mm width, about 15 mm of length, and about 0.02 mm of thickness, and a power supply lead 6 comprising a molybdenum wire are connected in series by welding means.

Then, a trigger wire 10 is mounted to the high pressure discharge lamp 1, by connecting one end 10a by directly wining to the power supply lead 6 of the electrode assembly 3L protruded from one sealing portion 9L, pressing an intermediate portion 10b against and in close contact with the surface of the light emitting portion 8 of the light emitting tube 7 in a stretched state, and winding and securing the other end 10c to the other sealing portion 9R being kept in the stretched state.

At a position of the cylindrical portion as the other sealing portion 9R away from the light emitting portion 8, an annular concave groove 11 is formed as a proximity guide portion C for disposing the trigger wire 10 at a distance shorter than that from the electrode assembly 3R sealed in the sealing portion 9R to the outer peripheral surface of the cylinder along the peripheral direction of the outer periphery thereof.

The other end 10c of the trigger wire 10 is wound around in the concave groove 11 and secured to the concave groove 11.

The trigger wire 10 may also be mounted by a procedure of at first winding and securing the other end 10c to the concave groove 11 and then winding and securing one end 10a to the power supply lead 6 of the electrode assembly 3L.

For the trigger wire 10, a wire of about 0.29 mm wire diameter comprising a highly heat resistant aluminum-iron-chromium alloy which is useable even at a high temperature region of about 1200° C. is used.

Further, the concave groove 11 for winding and securing the end 10c of the trigger wire 10 comprises an annular groove of about 1 mm width and about 0.5 mm depth formed at a position opposing to the metal foil 5 of the electrode assembly 3R sealed in the sealing portion 9R as shown in FIG. 1 and FIG. 2(a), and the annular groove is formed in the fabrication step of forming the sealing portions 9R, 9L by fusing both ends of the light emitting tube 7 while rotating the same, by a method of pressing a paddle (roller) made of a high density carbon against the outer periphery of the sealing portion 9R in which the electrode assembly 3R is secured. Further, the high pressure discharge lamp 1 mounted with the trigger wire 10 is mounted integrally with a concave reflection mirror 2 by fixing the sealing portion 9L not formed with the concave groove 11 to a bottom portion 12 of the concave reflection mirror 2 while aligning the optical axes of the light emitting tube 7 and the concave reflection mirror 2.

When a starting test was conducted for the high pressure discharge lamp 1 for the light source device constituted as described above, it was confirmed that the hot re-starting performance was outstandingly excellent compared with the existent high pressure discharge lamp 40 of an identical type shown in FIG. 15.

FIG. 3 shows the result of an experiment by providing high pressure discharge lamps 1 (FIG. 1) and high pressure discharge lamps 40 (FIG. 15), which were different only with respect to the mounting structure of the trigger wire each by the number of 50, putting off them after lighting for 30 min by a rated lamp power, and measuring the time required for re-starting from putting off at a starting voltage of 280 V with an applied pulse voltage of 4 KV.

According to this, in the existent high pressure discharge lamps 40, only about 50% of them was re-started within 60 sec from putting off as shown in the broken line and not a small portion of them required 90 sec or more till re-starting. On the contrary, in the high pressure discharge lamps 1 according to the invention, as shown by the solid line, those re-started within 60 sec from putting off reached about 100% and about 70 to 80% or more of them re-started within 40 to 50 sec form the putting off.

Accordingly, it can be said that the high pressure discharge lamp 1 of FIG. 1 remarkably shortens the rising time of the liquid crystal projector or the like.

Further, according to the experiment conducted by the present inventors, it was confirmed that when the concave groove 11 formed to the sealing portion 9R of the high pressure discharge lamp 1 was made deeper and the end 10c of the trigger wire 10 wound around and secured to the concave groove 11 was brought closer to the metal foil 5 sealed in the sealing portion 9R, the electric field intensity therebetween was increased more and the starting or re-starting performance of the lamp was further improved.

In this embodiment, the light emitting tube 7 is fixed at the sealing portion 9L not formed with the concave groove 11 to the concave reflection mirror 2, so that stress dose not exert on the other sealing portion 9R formed with the concave groove 11, by which the concave groove 11 can be made deeper to such an extent that the light emitting tube 7 is not flexed by the lowering of the mechanical strength.

The concave groove 11 used for securing the trigger wire 10 by winding is not restricted to the annular groove which is continuous along the peripheral direction of the sealing portion 9R as shown in FIG. 2(a) but may be an intermittent groove as a concave groove 11a,11b shown in FIG. 2(b). However, for improving the starting or re-starting performance of the lamp by approaching the trigger wire 10 to the metal foil 5 of the electrode assembly 3R, the intermittent groove such as a concave groove 11a,11b for securing the trigger wire 10 by winding is preferably formed at a position opposing to the lateral end of the metal foil 5 which is present nearest to the outer circumference of the sealing portion 9R as shown in FIG. 2(b).

Further, the method of forming the concave groove 11 is not restricted to the method of pressing the paddle (roller) to the surface of the outer periphery of the sealing portion 9R in which the electrode assembly 3R is sealed under heat melting as described above, but the concave groove 11 may be put to cutting fabrication by a grinding stone.

Further, as shown in FIG. 4(a), by fixing both ends of a light emitting tube 7 to chucks 21R, 21L of a glass lathe in a stage before sealing electrode assemblies 3R, 3L, heating the trigger wire winding and securing position P by a burner 22 under rotation, and pulling the chucks 21R, 21L slowly so as to be away from each other at the same time with the starting of fusion as shown FIG. 4(b), the hot-melted portion is narrowed to form a concave groove 11 of a U-shaped cross section (heat deformed portion).

By forming the concave groove 11 into the shape of the U-shaped cross section, stress concentration less occurs and the mechanical strength is increased more compared with the concave groove of a rectangular cross section.

Further, when a metal film 16 of high oxidation resistance such as gold, aluminum, nickel, etc is formed by vapor deposition or the like to the inner surface of the concave groove 11 and brought into electric contact with the trigger wire 10 wound around the concave groove 11, since the metal film 16 of the polarity opposite to the electrode assembly 3R is disposed in a state kept at the proximate positional relation, the electric field intensity formed between the metal foil 5 and the metal film 16 upon starting is higher compared with the case of winding the trigger wire 11 without forming the metal film 16.

Accordingly, since the potential difference formed between the electrode assemblies 3R,3L is increased by the electrostatic effect, the starting performance is improved more.

Further, a glass tube of a different diameter may be joined additionally and a concave groove 11 may be formed.

In this case, as shown in FIG. 5(a), a light emitting tube 7 with the length of the other sealing portion 9R being formed shorter as far as a trigger wire winding and securing position p is fixed to one chuck 21L of a glass lathe, a fine tube 23 constituting the bottom of the concave groove 11 is fixed coaxially to the other chuck 21R in a state abutting against the top end of the sealing portion 9R of the light emitting tube 7, and square corner portions 24 are hot melted while rotating the light emitting tube 7 and the fine tube 23 synchronously by acutely restricting the flame of a burner 22.

When the fine tube 23 is fused to the light emitting tube 7, the fine tube 23 is cut to a length corresponding to the width of the concave groove 11 by a fine cutter 25 as shown in FIG. 5(b).

Then, as shown in FIG. 5(c), when a glass tube 26 of an identical cross sectional shape with that of the sealing portion 9R is fixed coaxially in a state of abutting against the cut end face of the fine tube 23 to the other chuck 21R, and square corners 27 are hot-melted by acutely restricting the flame of the burner 22 while rotating the light emitting tube 7 and the glass tube 26 synchronously, the concave groove 11 as shown in FIG. 5(d) is formed.

Furthermore, the quartz at the trigger wire winding and securing position P may be heated to cause evaporation or thermal deformation thereby forming the concave groove 11 of an U-shaped cross section.

In this case, as shown in FIG. 6, when both ends of the light emitting tube 7 having electrode assemblies 3R, 3L sealed therein are fixed to the chucks 21R, 21L of the glass lathe and the trigger wire winding and securing position P is melted by a burner 22 or a laser while rotating them optionally to evaporate the quartz at the outer peripheral portion, a circular concave groove 11 may be formed along the peripheral direction as shown in FIG. 7(a) or intermittent grooves 11a, 11b may be formed on both surface and rear face of the sealing portion 9R of the light emitting tube 7 parallel to the direction perpendicular to the longitudinal direction as shown in FIG. 7(b).

Since the concave groove 11a, 11b has a U-shaped cross section formed with a moderate curved surface by heat deformation as described above, stress concentration less occurs even when an external force exerts and the mechanical strength is increased more compared with the case of a concave groove of a rectangular cross section.

Likewise, the outer peripheral portion of the sealing portion 9R may be deformed by pressing a jig of an U-shaped cross section by hot-melting under heating.

Example 2

FIG. 8 is an entire view showing another example of a light source device according to the invention and the constitution is identical with the light source device of FIG. 1 excepting that an auxiliary-reflection mirror 13 is disposed to a high pressure discharge lamp 1 and except for the mounting structure of a trigger wire 10.

In the high pressure discharge lamp 1 of FIG. 8, an auxiliary-reflection mirror 13 for reflecting a light emitted from a light emitting portion 8 of a light emitting tube 7 to an opening 14 of the concave reflection mirror 2 toward the light emitting portion 8 is mounted being situated between the light emitting portion 8 and a concave groove 11 as a proximity guide portion C for winging and securing the other end 10c of a trigger wire 10 to the outer periphery of a sealing portion 9R of the light emitting tube 7 formed with the concave groove 11 and a spiral guide groove 15c is foamed from the mounting position of the auxiliary-reflection mirror 13 to the concave groove 11 such that the trigger wire 10 is not protruded from the outer peripheral surface of the sealing portion 9R.

This can mount the trigger wire 10 in a state along the surface of the sealing portion 9R of the light emitting tube 7 and, at the same time, the auxiliary-reflection mirror 13 can be attached subsequently to the sealing portion 9R mounted with the trigger wire 10.

Further, a spiral guide groove 15a for mounting the trigger wire 10 in a state along the surface of a sealing portion 9L is formed also to the outer periphery of the sealing portion 9L of the light emitting tube 7, and an annular guide groove 15b is formed at the boundary between the sealing portion 9L and the light emitting portion 8.

Then, when the trigger wire 10 is mounted to the high pressure discharge lamp 1, after winding and securing at first one end 10a of the trigger wire 10 to a power supply lead 6 of an electrode assembly 3L fixed to the sealing portion 9L, an intermediate portion 10b of the trigger wire 10 is wound around a spiral guide groove 15a formed to the surface of the sealing portion 9L in the groove thereof, and then wound around an annular guide groove 15b in contiguous with the guide groove 15a. Then, it is transferred to the spiral guide groove 15c formed to the surface of the sealing portion 9R so as to wind around the surface of the emitting portion 8, and wound around along the guide groove 15c in the groove. Then, the other end 10c of the trigger wire 10 is wound and secured to the concave groove 11 in contiguous with the guide groove 15c. Thus, the trigger wire 10 is mounted entirely in a state along with the surface of the light emitting tube 7 and, at the same time, mounted such that the intermediate portion 10b is in close contact with the light emitting portion 8 of the light emitting tube 7 and tightly winding the light emitting portion 8. Contrary to the procedures described above, the other end 10c of the trigger wire 10 may be wound and secured at first in the concave groove 11 and, finally, one end 10a may be wound and secured to the power supply lead 6 of the electrode assembly 3L.

High pressure discharge lamps 1 of FIG. 8 and high pressure discharge lamps 40 of FIG. 15 each mounted with the trigger wire 10 were provided each by the number of 50 and when a test for comparing the cold starting performance and a hot re-starting performance was conducted, results as shown in FIG. 9 and FIG. 10 were obtained.

That is, FIG. 9 is a graph showing a relation between a cold starting ratio and a pulse voltage applied to a starting voltage of 280 V. The high pressure discharge lamps 40 of FIG. 15 did not start at all when a pulse voltage for the high voltage pulse to be applied to the starting voltage was 2 KV or lower, and a pulse voltage at least 4 KV or higher had to be applied in order to start the lamp 40 by 100% as shown by a broken line. On the other hand, about 100% of the high pressure discharge lamps 1 of FIG. 8 could be started at the pulse voltage of 2 KV or lower as shown by a solid line.

Further, FIG. 10 is a graph showing a relation between the hot re-starting ratio and the pulse voltage applied to the starting voltage at 280V. A pulse voltage of about 5 KV or higher had to be applied to the high pressure discharge lamps 40 of FIG. 15 for 100% starting as represented by a broken line. On the other hand, about 100% of the high pressure discharge lamps 1 of FIG. 8 could be started at a pulse voltage of 3KV or lower as represented by a solid line.

As described above in the high pressure discharge lamp 1 shown in FIG. 8, by mounting the trigger wire 10 in a state along with the surface of the light emitting tube 7 and approaching the end 10c closer to the metal foil 5 of the electrode assembly 3R as a counter electrode with the electrode assembly 3L connected with the trigger wire 10, cold starting performance and hot re-starting performance are improved outstandingly, and generation of noises can be prevented reliably by lowering the pulse voltage applied to the starting voltage can be lowered to less than that of the high pressure discharge lamp 40 of FIG. 15.

Example 3

FIG. 11 is an explanatory view showing a main portion of other light source device according to the invention.

The light source device of this embodiment is identical with the light source device shown in FIG. 1 excepting that a trigger wire insertion hole 17 of about 1 mm diameter is bored instead of the concave groove 11 as a proximity guide portion C formed to the sealing portion 3R of the high pressure discharge lamp 1.

As shown in FIG. 12, the trigger wire insertion hole 17 is perforated by at first fixing both ends of a light emitting tube 7 having electrode assemblies 3R, 3L sealed therein to chucks 21R, 21L of a glass lathe and, without rotating them, irradiating a laser light from a laser 28 the optical axis thereof being set so as not to cross a metal foil 5 of the electrode assembly 3R at a trigger wire winding and securing position P of the sealing portion 9R.

The thus perforated trigger wire insertion hole 17 may be perforated in a direction perpendicular to the metal foil 5 as shown in FIGS. 13a(a) and (b), or may be perforated in parallel with the metal foil 5 as shown in FIGS. 13(c) and (d).

Further, it may be perforated so as to pass through the sealing portion 9R as shown in FIGS. 13(a) and (c), or may be perforated to a depth opposing to the metal foil 5 without passing through the sealing portion 9R as shown in FIGS. 13(b) and (d).

Then, when the other end 10c of the trigger wire 10 is wound and secured to the trigger wire insertion hole 17 formed by passing though the sealing portion 9R, the other end 10c of the trigger wire 10 may be inserted from one end of the insertion hole 17, led out of the other end and, optionally, entwined to the trigger wire 10 wound around the sealing portion 9R as shown in FIGS. 13(a) and (c).

Further, in a case of winding and securing the other end 10c of the trigger wire 10 to the not perforated trigger wire insertion hole 17, this may be attained, as show in FIGS. 13(b) and (d), by turning back the trigger wire 10 in a loop form, pressing the turned back end into the insertion hole 17 and entwining the other end 10c led out of the opening optionally to the trigger wire 10 wound around the sealing portion 9R.

In this embodiment, since the trigger wire 10 can be positioned in close proximity to the metal foil 5 by inserting the trigger wire 10 into the insertion hole 17 thereby situating it at a distance shorter than that from the metal foil 5 of the electrode assembly 3R to the outer peripheral surface of a cylindrical portion as the sealing portion 9R, the electric field intensity generated between the trigger wire 10 and the metal foil 5 upon starting is increased and the starting performance of the lamp can be improved.

Example 4

FIG. 14 shows a still further embodiment in which those portions in common with FIG. 1 carry same reference numerals for which detailed descriptions are to be omitted.

In the description for the embodiments above, while description has been made to a case of forming the proximity guide portion C to the sealing portion 9R on the side not fixed to the concave reflection mirror 2, the proximity guide portion C is formed to a sealing portion 9L on the side fixed to a concave reflection mirror 2 in this embodiment as show in FIG. 14.

Then, in the high pressure discharge lamp 1, a trigger wire 10 is mounted such that one end 10a is connected by directly winding and securing to a power supply lead 6 of an electrode assembly 3R protruded from a sealing portion 9R on the side not fixed to a concave reflection mirror 2, an intermediate portion 10b is in a stretched state so as to be pressed against and in close contact with the surface of a light emitting portion 8 of a light emitting tube 7, and the other end 10c is wound around and secured to a sealing portion 9L on the side fixed to a concave reflection mirror 2.

At a position of a cylindrical sealing portion 9L away from the light emitting portion 8, an annular concave groove 11 is formed as the proximity guide portion C for disposing the trigger wire 10 at a distance shorter than that from the electrode assembly 3L sealed in the sealing portion 9L to the outer peripheral surface of the cylinder along the peripheral direction of the outer periphery.

The other end 10c of the trigger wire 10 is wound and secured in the concave groove 11 being wound around in the concave groove 11. Other constitutions than described above are in common with those in FIG. 1.

In this case, since stress concentration tends to occur compared with the case of forming the concave groove 11 to the sealing portion 9R on the side not fixed to the concave reflection mirror 2, the concave groove 11 is formed to a substantially U-shaped cross sectional shape for the groove shape comprising a moderate curved surface in the same manner as in the proximity guide portion C show in FIG. 4 or FIG. 7, by which the stress concentration is moderated.

Also in this embodiment, improvement in the re-starting performance was confirmed like the embodiment in FIG. 1.

INDUSTRIAL APPLICABILITY

The present invention can remarkably improve the starting and re-starting performances of the high pressure discharge lamp used as the light source for liquid crystal projectors or projection televisions, and can greatly shorten the rising time without generating noises that cause erroneous operation to the liquid crystal projectors, etc.

BRIEF DESCRIPTION OF THE DRAWINGS

FIG. 6 is an explanatory view showing a further method of forming a concave groove.

FIG. 7 is a perspective view showing a high pressure discharge lamp formed with a concave groove by the method of FIG. 6.

Figure 1:
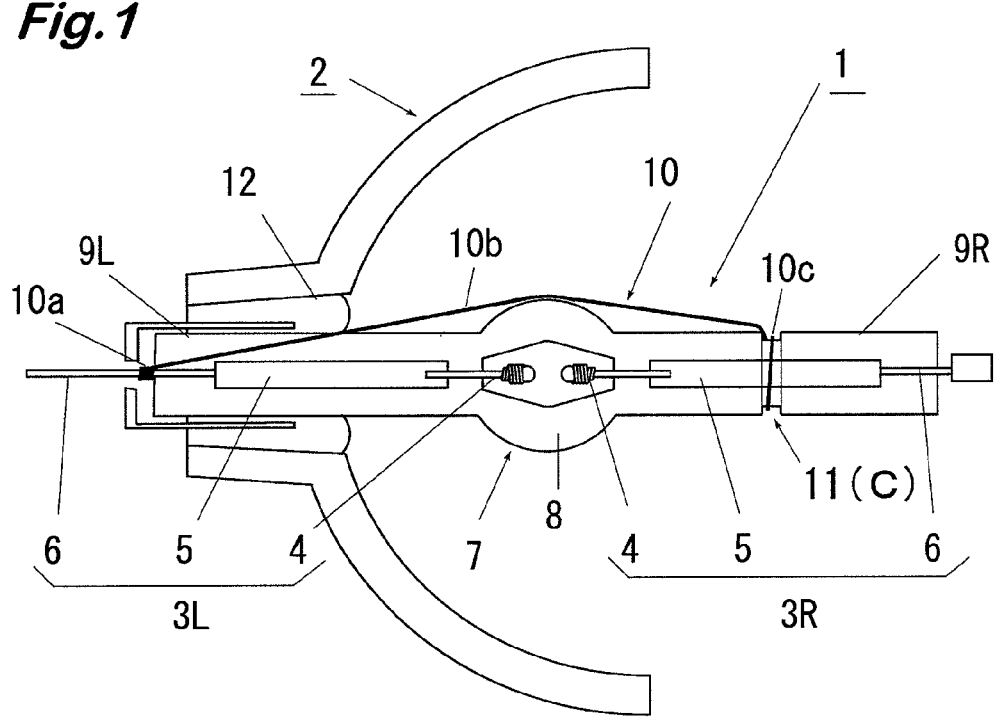
FIG. 1 is an entire view showing an example of a light source device according to the invention.
Figures 2A, 2B:
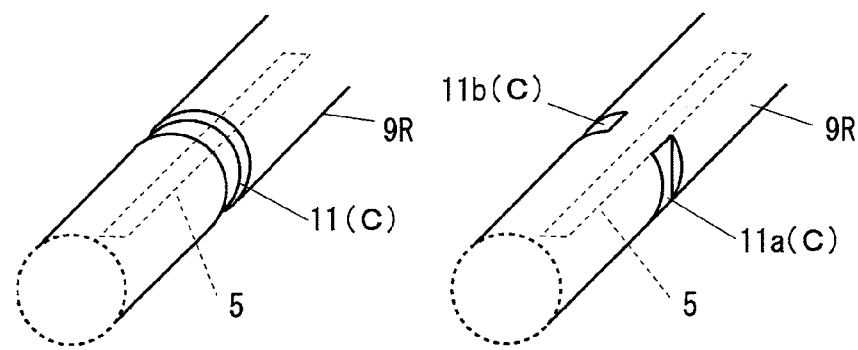
FIG. 2 is an enlarged fragmentary perspective view showing a constitutional example of a concave groove as a proximity guide portion.
Figure 3:
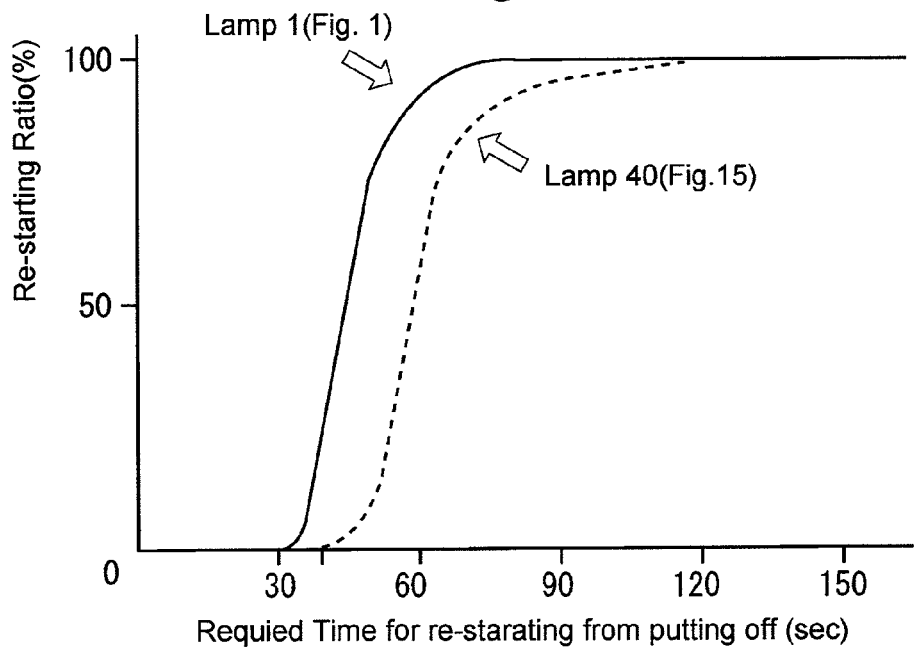
FIG. 3 is a graph showing the result of a re-starting experiment on a high pressure discharge lamp.
Figure 4A:
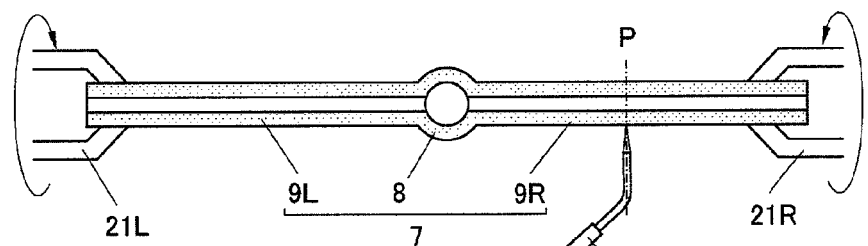
FIG. 4 is an explanatory view showing a method of forming a concave groove.
Figure 4B:
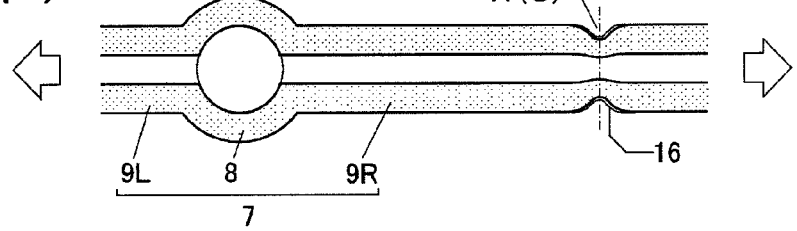
Figure 5A:
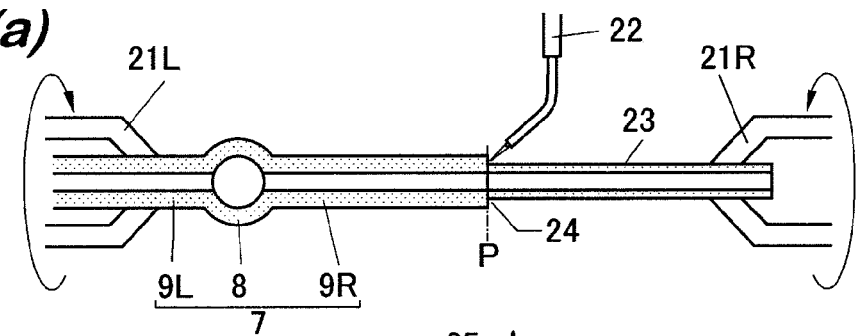
FIG. 5 is an explanatory view showing another method of forming a concave groove.
Figure 5B:
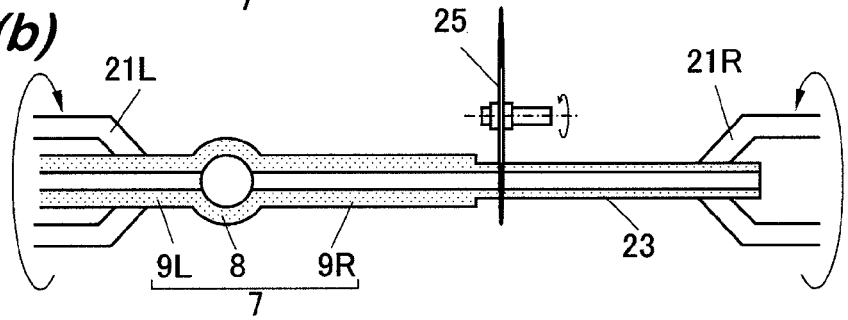
Figure 5C:
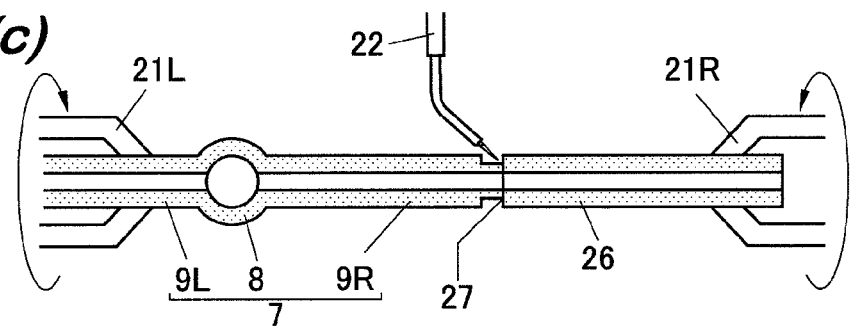
Figure 5D:
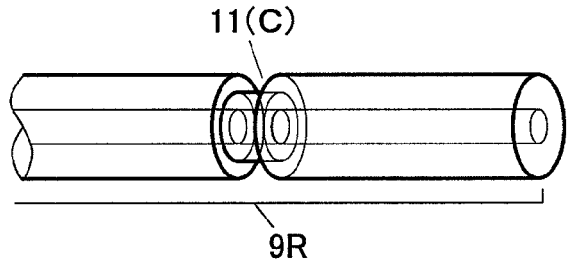
Figure 8:
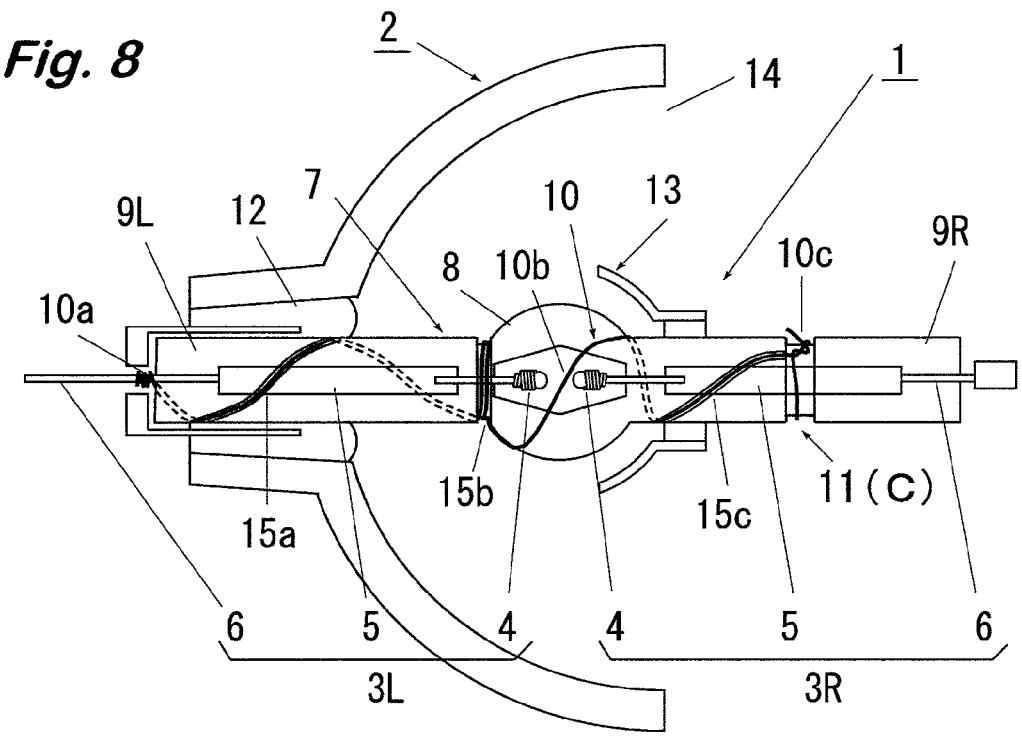
FIG. 8 is a view showing another example of a light source device according to the invention
Figure 9:
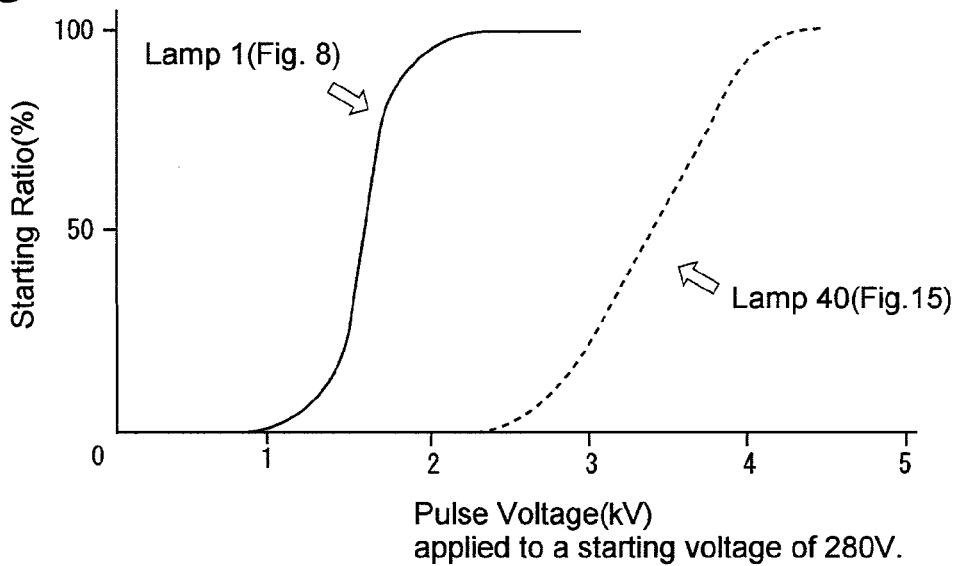
FIG. 9 is a graph showing a relation between a cold starting ratio and a pulse voltage applied upon starting.
Figure 10:
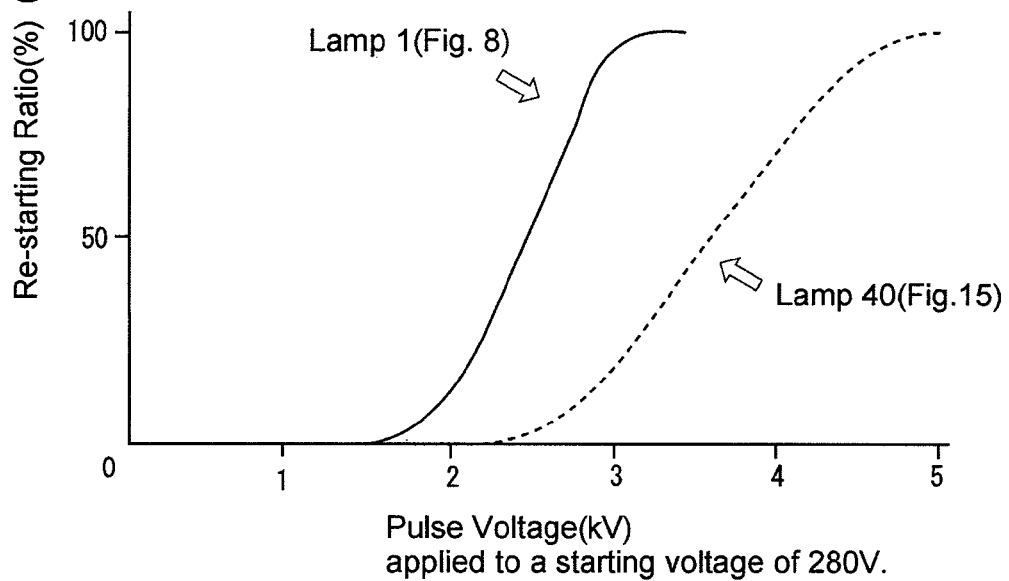
FIG. 10 is a graph showing a relation between a hot re-starting ratio and a pulse voltage applied upon starting.
Figure 11:
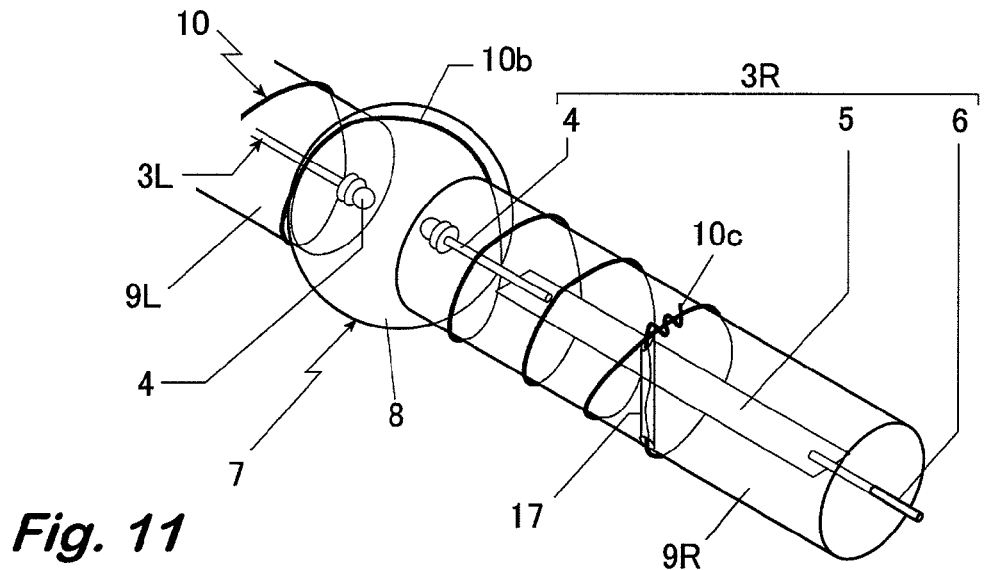
FIG. 11 is a perspective view showing a main portion of a further light source device according to the invention.
Figure 12:
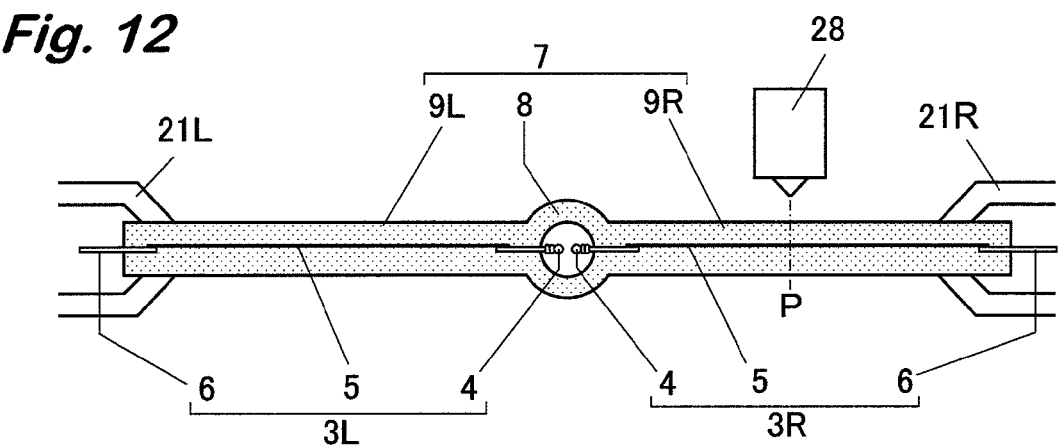
FIG. 12 is a explanatory view showing a method of forming a trigger wire insertion hole.
Figures 13A, 13B, 13C, 13D:
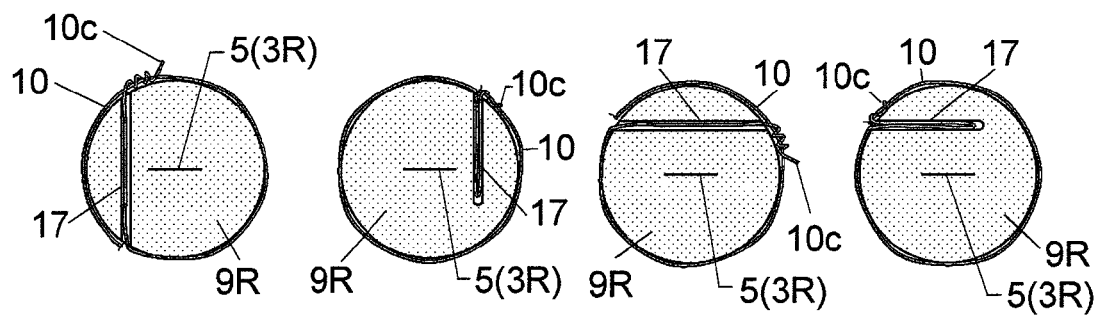
FIG. 13 is an explanatory view showing a winding state of a trigger wire to the trigger wire insertion hole.
Figure 14:
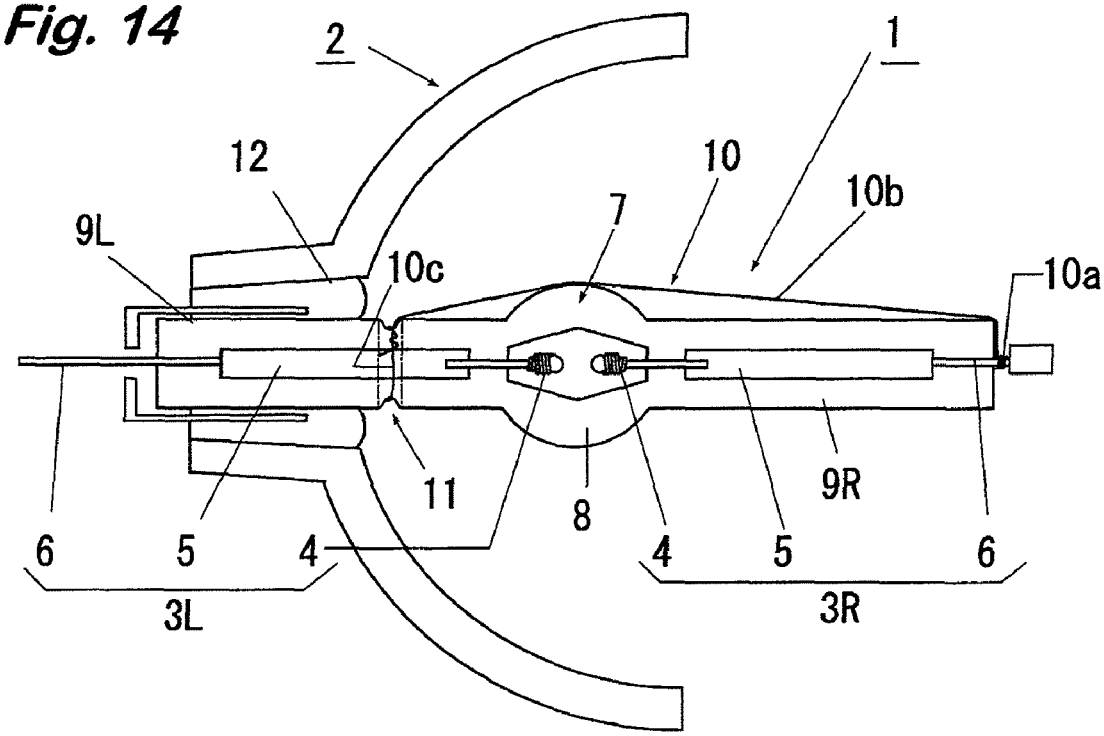
FIG. 14 is a view showing other example of a light source device according to the invention.
Figure 15:
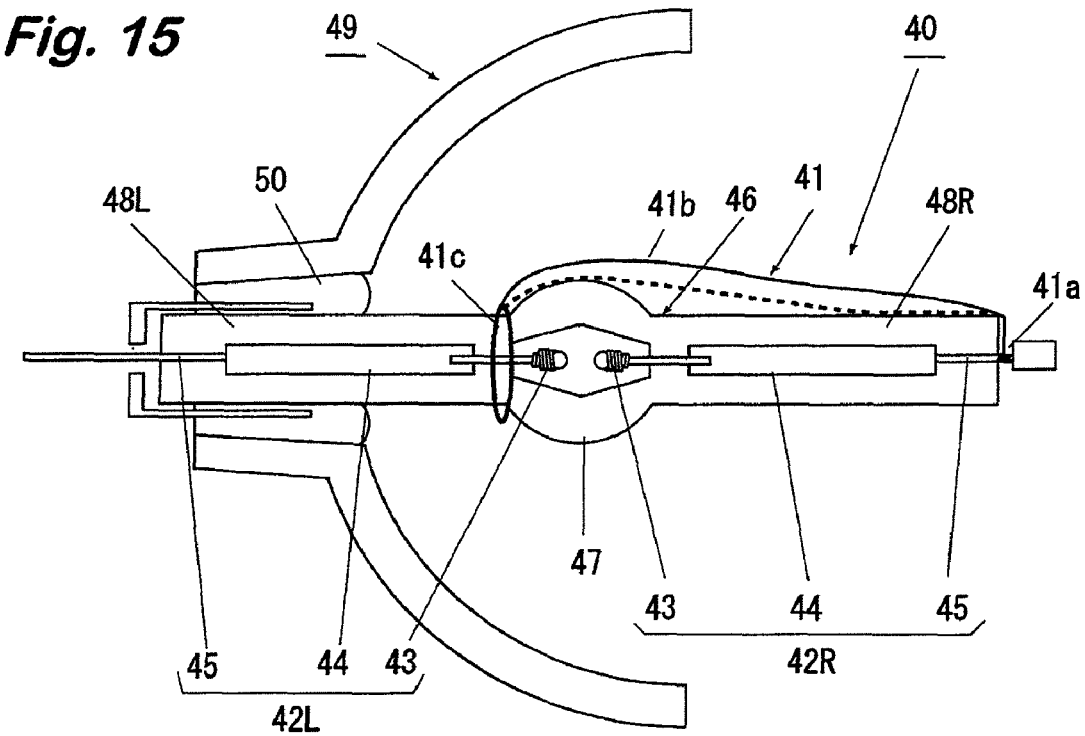
FIG. 15 is an explanatory view showing an existent light source device.
Figure 16:
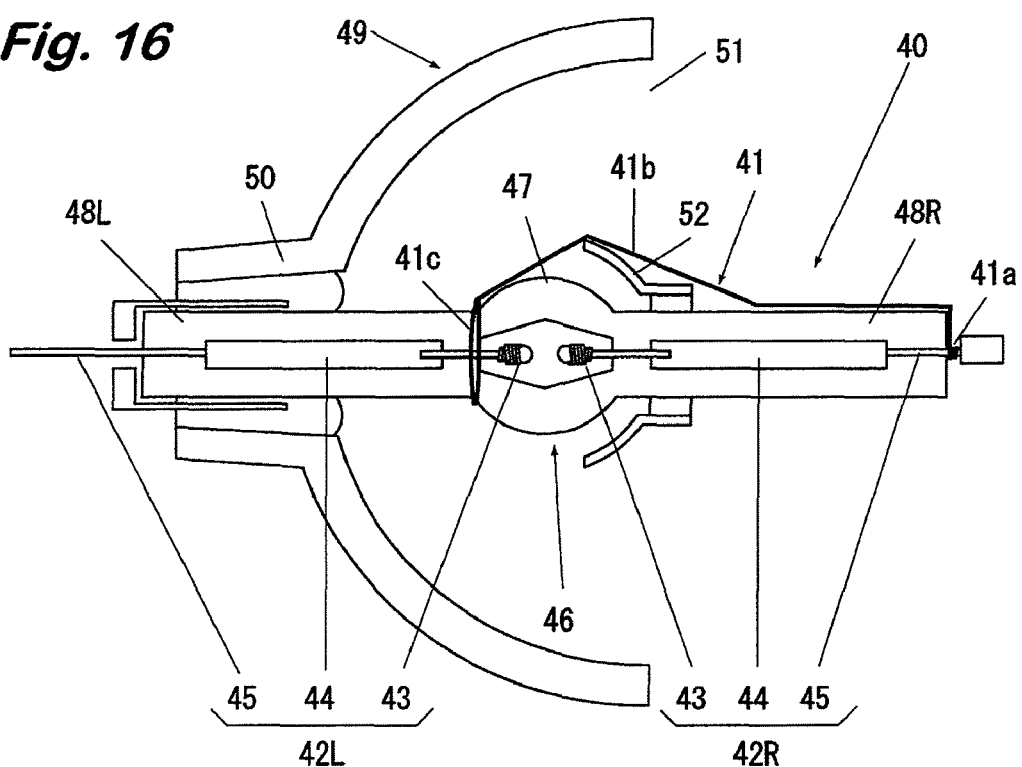
FIG. 16 is an explanatory view showing an existent light source device.

DESCRIPTION FOR REFERENCES 1 high pressure discharge lamp
2 concave reflection mirror
3R electrode assembly
3L electrode assembly
4 electrode
5 metal foil
6 power supply lead
7 light emitting tube
8 light emitting portion
9L sealing portion
9R sealing portion
10 trigger wire
10a one end of a trigger wire
10b intermediate portion of a trigger wire
10c the other end of a trigger wire
C proximity guide portion
11 concave groove (annular groove)
11a concave groove (intermittent groove)
11b concave groove (intermittent groove)
12 bottom portion of a concave reflection mirror
13 auxiliary-reflection mirror
14 opening for a concave reflection mirror
15a guide groove
15b guide groove
15c guide groove
16 metal film
17 insertion hole

The invention claimed is:

1. A light source device comprising:
a high pressure discharge lamp; and
a trigger wire for starting the lamp,
the high pressure discharge lamp including:
    a light emitting tube having a light emitting portion;
    a pair of first and second electrode assemblies each having an electrode connected by way of a metal foil with a power supply lead; and
    a pair of first and second substantially cylindrical sealing portions formed on first and second longitudinal sides of the light emitting portion, respectively,
wherein the electrode assemblies are inserted on first and second ends of the light emitting tube and sealed in the first and second substantially cylindrical sealing portions such that the respective first and second electrodes oppose each other in the light emitting portion,
wherein a first end of the trigger wire is connected to the power supply lead of the first electrode assembly protruding from the first substantially cylindrical sealing portion, and a second end of the trigger wire is wound around an outer periphery of the second substantially cylindrical sealing portion, wherein a proximity guide portion is disposed at the second substantially cylindrical sealing portion such that the trigger wire is disposed closer to the electrode assembly than an outer peripheral surface of the second substantially cylindrical sealing portion and at a position spaced from the light emitting portion, and wherein the proximity guide portion is a concave groove formed along a peripheral direction at the outer peripheral surface of the second substantially cylindrical sealing portion.

2. The light source device according to claim 1, wherein the concave groove is formed at a position opposing the metal foil of the second electrode assembly sealed in the second substantially cylindrical sealing portion.

3. The light source device according to claim 1, wherein the high pressure discharge lamp is mounted integrally with a concave reflection mirror on the first substantially cylindrical sealing portion such that the first substantially cylindrical sealing portion is fixed to a bottom portion of the concave reflection mirror.

4. The light source device according to claim 3, wherein an auxiliary-reflection mirror for reflecting a light emitted from the light emitting portion of the light emitting tube to an opening of the concave reflection mirror toward the light emitting portion is mounted to the outer peripheral surface of the second substantially cylindrical sealing portion between the light emitting portion and the concave groove, and a guide groove is formed for wiring the trigger wire from the auxiliary-reflection mirror to the concave groove so as to prevent the trigger wire from of protruding from the outer peripheral surface of the second substantially cylindrical sealing portion.

5. The light source device according to claim 1, wherein a metal film is formed at an inner surface of the concave groove.

6. The light source device according to claim 1, wherein a guide groove is formed at the outer peripheral surface of both of the first and second substantially cylindrical sealing portions for wiring the trigger wire along a surface of the light emitting tube.

7. The light source device according to claim 1, wherein the concave groove is a thermally deformed portion formed by partially reducing the second substantially cylindrical sealing portion diametrically.

8. The light source device according to claim 1, wherein the concave groove is a thermally deformed portion formed by partially deforming the second substantially cylindrical sealing portion into an ellipsoidal cylindrical shape.

9. A light source device comprising:
a high pressure discharge lamp; and
a trigger wire for starting the lamp,
the high pressure discharge lamp including:
 a light emitting tube having a light emitting portion;
 a pair of first and second electrode assemblies each having an electrode connected by way of a metal foil with a power supply lead; and
 a pair of first and second substantially cylindrical sealing portions formed on first and second longitudinal sides of the light emitting portion, respectively,
wherein the electrode assemblies are inserted on first and second ends of the light emitting tube and sealed in the first and second substantially cylindrical sealing portions such that the respective first and second electrodes oppose each other in the light emitting portion,
wherein a first end of the trigger wire is connected to the power supply lead of the first electrode assembly protruding from the first substantially cylindrical sealing portion, and a second end of the trigger wire is wound around an outer periphery of the second substantially cylindrical sealing portion,
wherein a proximity guide portion is disposed at the second substantially cylindrical sealing portion such that the trigger wire is disposed closer to the electrode assembly than an outer peripheral surface of the second substantially cylindrical sealing portion and at a position spaced from the light emitting portion, and
wherein the proximity guide portion is a trigger wire insertion hole perforated in the second substantially cylindrical sealing portion so as not to be in contact with the second electrode assembly.

10. The light source device according to claim 9, wherein the trigger wire insertion hole passes through the second substantially cylindrical sealing portion.

* * * * *